(12) United States Patent
Goris

(10) Patent No.: US 9,210,414 B2
(45) Date of Patent: Dec. 8, 2015

(54) MULTI-VIEW DISPLAY SYSTEM AND METHOD THEREFOR

(75) Inventor: Roeland Focco Everhard Goris, Veldhoven (NL)

(73) Assignee: TP VISION HOLDING B.V., Eindhoven (NL)

( * ) Notice: Subject to any disclaimer, the term of this patent is extended or adjusted under 35 U.S.C. 154(b) by 445 days.

(21) Appl. No.: 13/807,924

(22) PCT Filed: Jun. 28, 2011

(86) PCT No.: PCT/IB2011/052830
§ 371 (c)(1),
(2), (4) Date: Aug. 30, 2013

(87) PCT Pub. No.: WO2012/001619
PCT Pub. Date: Jan. 5, 2012

(65) Prior Publication Data
US 2014/0043450 A1 Feb. 13, 2014

(30) Foreign Application Priority Data
Jun. 30, 2010 (EP) .................................... 10167818

(51) Int. Cl.
*H04N 13/04* (2006.01)
(52) U.S. Cl.
CPC ......... *H04N 13/045* (2013.01); *H04N 13/0438* (2013.01)
(58) Field of Classification Search
USPC ........................................................ 348/56
See application file for complete search history.

(56) References Cited

U.S. PATENT DOCUMENTS

| | | | | |
|---|---|---|---|---|
| 4,979,033 A * | 12/1990 | Stephens | ............ | H04N 13/0497 348/51 |
| 8,164,598 B2 * | 4/2012 | Kimpe | ...................... | G09G 3/20 345/204 |
| 2006/0152812 A1* | 7/2006 | Woodgate | ............... | G02B 3/005 359/619 |
| 2007/0013624 A1* | 1/2007 | Bourhill | ................. | B82Y 20/00 345/84 |
| 2007/0018585 A1* | 1/2007 | Ijzerman | .................. | G09F 19/14 315/15 |
| 2007/0129864 A1* | 6/2007 | Tanaka | .................... | B60K 35/00 701/36 |
| 2007/0222855 A1* | 9/2007 | Krijn | .................. | H04N 13/0413 348/42 |
| 2007/0285775 A1* | 12/2007 | Lesage | .................. | G02F 1/1335 359/465 |

(Continued)

*Primary Examiner* — Dave Czekaj
*Assistant Examiner* — Leron Beck
(74) *Attorney, Agent, or Firm* — Shimokaji IP

(57) ABSTRACT

A multi-view display system comprises a display controller (307) which controls a display (301) to display a sequence of multi-view images in repeating view frames. A shutter device (311), such as shutter glasses, comprises at least two shutter elements arranged to switch between an open shutter mode and a less transparent closed shutter mode. Each shutter element is associated with a view of the plurality of views. A shutter driver (309) controls the shutter elements in repeating shutter frames (413) having a shutter time slot for each of the shutter elements. The shutter elements are in the open shutter mode during an allocated shutter time slot and otherwise in the closed shutter mode. The shutter frame rate of the repeating shutter frames is higher than a view frame rate of the repeating view frames. The invention may reduce flicker while maintaining a low frame rate, e.g. for 3D displays.

13 Claims, 6 Drawing Sheets

(56) References Cited

U.S. PATENT DOCUMENTS

| | | | | |
|---|---|---|---|---|
| 2007/0291172 A1* | 12/2007 | Kouzimoto | B60R 11/02 | 348/488 |
| 2008/0043094 A1* | 2/2008 | Ijzerman | H04N 13/0454 | 348/43 |
| 2008/0252639 A1* | 10/2008 | Ijzerman | H04N 13/0404 | 345/419 |
| 2009/0058845 A1* | 3/2009 | Fukuda | B60K 35/00 | 345/214 |
| 2011/0199460 A1* | 8/2011 | Gallagher | H04N 13/0431 | 348/46 |
| 2011/0199463 A1* | 8/2011 | Gallagher | H04N 13/0404 | 348/53 |
| 2011/0199468 A1* | 8/2011 | Gallagher | H04N 13/0452 | 348/59 |
| 2011/0199469 A1* | 8/2011 | Gallagher | H04N 13/0285 | 348/60 |
| 2012/0236133 A1* | 9/2012 | Gallagher | H04N 13/0018 | 348/60 |
| 2013/0002541 A1* | 1/2013 | Kanehira | G09G 5/34 | 345/156 |
| 2013/0169763 A1* | 7/2013 | Choi | H04N 13/04 | 348/51 |

* cited by examiner

MULTI-VIEW DISPLAY SYSTEM AND METHOD THEREFOR

FIELD OF THE INVENTION

The invention relates to a multi-view display system and in particular, but not exclusively, to display systems for displaying three dimensional images.

BACKGROUND OF THE INVENTION

Multi-view display systems wherein a user may be presented with a plurality of views of a scene are receiving increasing interest and significant research is undertaken in how to provide such multi-view experiences.

A popular application of multi-view display systems is three dimensional (3D) displays which add a third dimension to the viewing experience by providing a viewer's two eyes with different views of the scene that is being watched.

The field of 3D video and image rendering is evolving very rapidly these days. For example, 3D films are becoming increasingly prevalent in cinemas and 3D content is beginning to become available in the home via e.g. the BluRay 3D standard, HDMI 1.4 standard with 3D support, 3D enabled gaming consoles, computer graphics cards, and 3D television broadcasting, etc. Indeed, currently a number of 3D televisions are being introduced to the general consumer market. These televisions are typically based on fast Liquid Crystal Display (LCD) panels with shutter glasses. This time sequential active shutter technology has a number of advantages including low cost implications, no impact on the two-dimensional performance of the display, and the support of full High Definition in 3D. The perceived 3D quality is mainly driven by the basic two dimensional image quality, the amount of cross-talk between images (i.e. how much of the left image is visible with the right eye and vice versa), the amount of flicker, and the amount of light output.

However, these requirements tend to be conflicting requirements and suboptimal trade-offs are typically required. Specifically, current displays have relatively slow response times and therefore the image frame rate must be kept relatively low to ensure that the display has time to adjust to new pixel values. The response time is typically in the order of 4-8 msecs which result in most practical displays being limited to image frequencies of around 120 Hz. However, even at this rate, the response times is rarely sufficiently low to avoid some distortion of the two dimensional images and this may results in some quality degradation.

Furthermore, for a 3D display that alternates images for the viewer's two eyes, an image frequency of 120 Hz results in an image frequency for each eye of 60 Hz. Thus, each shutter of the shutter glasses switch between transparent and opaque with a frequency of 60 Hz. However, the resulting 60 Hz flickering is noticeable to the typical viewer and may significantly degrade the perceived quality and user experience.

Hence, an improved multi-view display system would be advantageous and in particular a system allowing increased flexibility, improved trade-off between requirements, reduced flickering, increased image quality, facilitated implementation and/or improved performance would be advantageous.

U.S. Pat. No. 4,979,033 A discloses a stereoscopic video system and method in which left and right images are displayed during alternate fields of a video picture frame by means of a display and shutter elements.

EP 2 015 589 A1 discloses a stereoscopic projection display system with scanning of light valves.

SUMMARY OF THE INVENTION

Accordingly, the Invention seeks to preferably mitigate, alleviate or eliminate one or more of the above mentioned disadvantages singly or in any combination.

According to an aspect of the invention there is provided a multi-view display system comprising: a display controller for controlling a display to display a sequence of multi-view images in repeating view frames where each view frame comprises a view time slot allocated to each view of a plurality of views; a shutter device comprising at least two shutter elements arranged to switch between an open shutter mode and a closed shutter mode, the open shutter mode being more transparent than the closed shutter mode and each shutter element being associated with a view of the plurality of views; a shutter driver for controlling the at least two shutter elements in repeating shutter frames having a shutter time slot for each of the at least two shutter elements with a shutter element being in the open shutter mode during an allocated shutter time slot and in the closed shutter mode during other shutter time slots; wherein a shutter frame rate of the repeating shutter frames is higher than a view frame rate of the repeating view frames.

The invention may provide an improved multi-view display system. In particular, the invention may in many embodiments allow reduced flickering and/or reduced degradation due to pixel response times for the display.

The invention may be particularly applicable to a 3D display system and may provide an improved 3D experience and enhanced quality in many embodiments. In particular, a reduced perception of flickering may be achieved in many embodiments without introducing unacceptable degradations due to slow pixel response times.

The inventors have realized that the perceived flickering tends to be dominated by flickering introduced to external light sources rather than by screen flickering. The inventor has furthermore realized that this can be exploited by operating the shutter device and display at different frequencies such that a high flickering frequency is combined with a lower image display frequency. This results in reduced perception of flickering while allowing the display to sufficiently settle between images.

The plurality of views may specifically comprise a first view associated with one eye of a viewer and a second view associated with the other eye of the viewer. The plurality of views may specifically be limited to only two views and the repeating view frames may alternate between different views and specifically between two views corresponding to one for each eye. Thus, the view frame may specifically comprise only two view time slots.

The shutter device may specifically comprise one shutter element for one eye of a viewer and one shutter element for the other eye of the viewer. The shutter device may contain only two shutter elements. The shutter device may specifically be a pair of shutter glasses.

In many embodiments, the shutter frame rate may advantageously be at least 90 Hz, and in many scenarios advantageously at least 110 Hz.

In many embodiments, the view frame rate may advantageously be no more than 60 Hz, and in many scenarios advantageously no more than 50 Hz.

In many embodiments, at least one of the shutter frame rate and the view frame rate may be a multiple of an image rate for a video signal to be displayed (and specifically of a video signal comprising the sequence of multi-view images). In many embodiments, at least one of the shutter frame rate and the view frame rate may be a multiple of 24 Hz.

Each view frame may present one image of the sequence of multi-view images.

In accordance with an optional feature of the invention, the display controller is operable to switch a display mode of the display between an image non-display mode and an image display mode, and the multi-view display system is arranged to synchronize the shutter time slots and the display mode.

This may provide advantageous performance and may especially reduce or minimize cross-talk.

The brightness of the display is higher in the image display mode than in the image non-display mode. In many embodiments, the brightness of the display is no less than twice or even ten times higher in the image display mode than in the image non-display mode. In some embodiments, the image display may be completely switched off during the image non-display mode.

In accordance with an optional feature of the invention, the synchronization is such that during a view time slot associated with a first view, the display is in the image non-display mode during shutter time slots of a shutter element not associated with the first view.

This may provide advantageous performance and may especially reduce or minimize cross-talk. In particular, it may prevent or mitigate cross-talk resulting from different frame rates for the repeating shutter frames and the repeating view frames.

In accordance with an optional feature of the invention, the synchronization is such that during a view time slot associated with a first view, the display is in the image display mode during at least one shutter time slot of a shutter element associated with the first view.

This may provide advantageous performance and may especially ensure that the image of the view time slot is perceivable by a user.

In some embodiments, the synchronization may be such that during the view time slot associated with the first view, the display is in the image display mode only during a subset of shutter time slots of the shutter element associated with the first view. The subset may specifically comprise only a single shutter time slot.

In accordance with an optional feature of the invention, each view time slot comprises at least one display image frame time slot having a duration longer than a shutter time slot, the display image frame time slot being a time slot corresponding to an image frame rate for the display.

This may allow improved performance and in particular may allow higher frame rates of the repeating shutter frames thereby reducing the perceived flickering. The duration of the display image frame time slot may specifically correspond to a duration of an image frame rate of the display and thus the approach may allow for the frame rate of the repeating shutter frames to not be restricted by the image display frame rate that can be achieved by the display. In some embodiments improved performance may be achieved by not unduly restricting the shutter device operation by the characteristics or properties of the display. The display image frame time slot may specifically be an image addressing time slot required to address the pixels of the image being displayed.

In accordance with an optional feature of the invention, each view time slot comprises at least one display image frame time slot having a duration corresponding to a shutter time slot and a display image frame time slot period for consecutive display image frame time slots exceeding a shutter time slot duration, the display image frame time slot being a time slot corresponding to an image frame rate for the display.

This may provide improved performance in many scenarios and may specifically allow timings of the display to be coordinated or synchronized. For example, it may allow a scanning backlight to be synchronized with display addressing. In some embodiments, the display image frame time slot repetition may be made up by an image addressing time interval corresponding to the shutter time slot and a blanking time interval.

In accordance with an optional feature of the invention, the display controller is arranged to switch a display mode by controlling a backlight of the display to have a lower intensity in the image non-display mode than in the image display mode.

This may allow improved performance and/or facilitated implementation or operation in many embodiments. The backlight may specifically be controlled to have a light intensity in the image non-display mode that is no more than half, or even one tenth, of the light intensity in the image display mode. In some embodiments, the display controller may be arranged to switch the backlight on and off.

In accordance with an optional feature of the invention, the backlight is a scanning backlight and the display controller is arranged to synchronize a scanning of the backlight and a display image frame time slot corresponding to an image frame rate for the display.

This may allow a particularly advantageous performance and facilitated operation.

In accordance with an optional feature of the invention, each view time slot comprises at least two display image frame time slots corresponding to an image frame rate for the display, and the display controller is arranged to drive the display in response to a same multi-view image in the at least two display image frame time slots.

This may provide improved performance and/or facilitated implementation in many scenarios, and may in particular allow improved image quality for slower pixel response times while still allowing high rate shutter frames.

In accordance with an optional feature of the invention, the display controller is operable to operate the display in an image non-display mode and in an image display mode, and to operate the display in the image non-display mode during at least one of the at least two display image frame time slots.

This may allow improved performance and/or facilitated implementation in many scenarios. In particular, it may provide improved image quality and reduced degradation due to pixel response or settling times. The at last one of the at least two display image frame time slots may specifically be the first display image frame of the view time slot.

In accordance with an optional feature of the invention, the shutter device is arranged to synchronize a shutter time slot for a shutter element associated with a first view to overlap at least one time interval in view frames for the first view in which the display is in the image display mode.

This may provide improved performance and may in particular ensure a reasonable bright image to be perceived in each view time slot while at the same time allowing a high shutter frame rate and thus reduced flickering.

In accordance with an optional feature of the invention, the shutter frame rate is at least twice the view frame rate.

This may provide an advantageous trade-off between time for the pixels to settle/respond and the flickering frequency, and thus between image quality and perceived flickering. In many scenarios, the shutter frame rate may advantageously be an integer multiple of the view frame rate, and may in particular be N times higher where N is an integer larger than one. This may reduce flickering while allowing for realistic response times and may substantially facilitate operation and synchronization.

According to an aspect of the invention there is provided a method of operation for a multi-view display system including a shutter device comprising at least two shutter elements arranged to switch between an open shutter mode and a closed shutter mode, the open shutter mode being more transparent than the closed shutter mode and each shutter element being associated with a view of a plurality of views; the method comprising: for controlling a display to display a sequence of multi-view images in repeating view frames where each view frame comprises a view time slot allocated to each view of the plurality of views; and controlling the at least two shutter elements in repeating shutter frames having a shutter time slot for each of the at least two shutter elements with a shutter element being in the open shutter mode during an allocated shutter time slot and in the closed shutter mode during other shutter time slots; wherein a shutter frame rate of the repeating shutter frames is higher than a view frame rate of the repeating view frames.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME
EMBODIMENTS OF THE INVENTION

The following description focuses on embodiments of the invention applicable to a 3D display system, and in particular to a 3D display system using shutter glasses. However, it will be appreciated that the invention is not limited to this application but may be applied to many other multi-view display systems.

Figure 1:
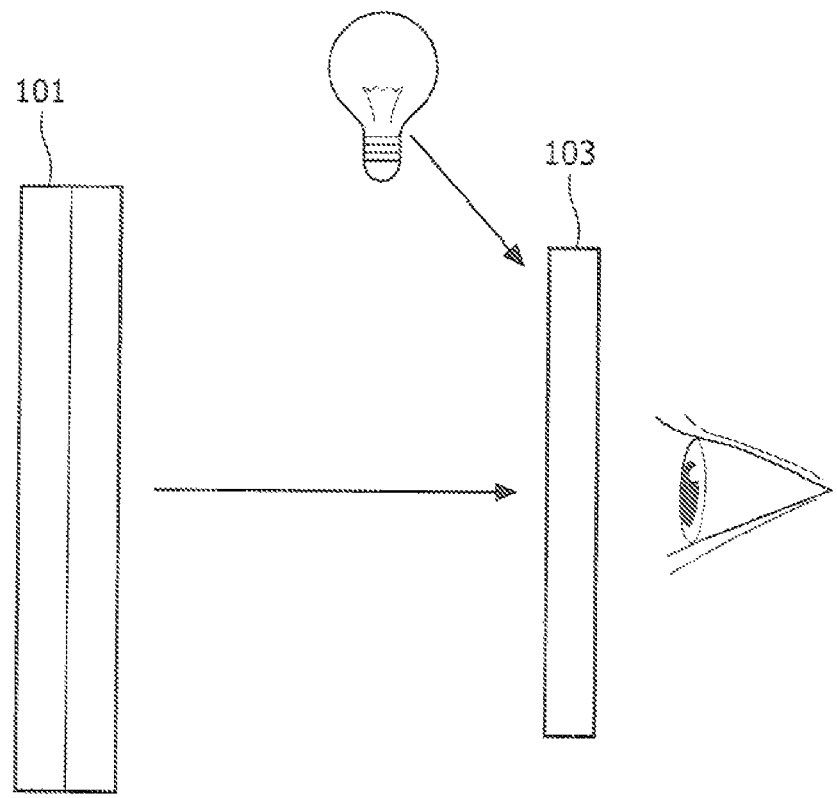
FIG. 1 is an illustration of an example of a display system.

FIG. 1 illustrates an example of a setup for a three dimensional viewing experience. A display 101 generates time sequential images. In particular, the display 101 alternates between images intended for the right and left eyes of the viewer. The viewer wears a pair of shutter glasses which comprises a shutter element 103 in front of each eye. The shutter elements 103 are arranged to switch between an open shutter mode in which light is allowed through and a closed shutter mode in which light is blocked. Each of the shutter elements 103 are switched between the open and closed shutter mode in synchronicity with the images on the display 101 such that the right shutter element 103 is only in the open shutter mode when the right eye image is displayed on the display 101 and the left shutter element is only in the open shutter mode when the left eye image is displayed on the display 101. Accordingly, the right eye of the viewer is only presented with the sequence of right eye images and the left eye of the viewer is only presented with the sequence of left eye images. Thus, individual images are presented to the viewer's two eyes thereby enabling a 3D rendering of images.

Figure 2:
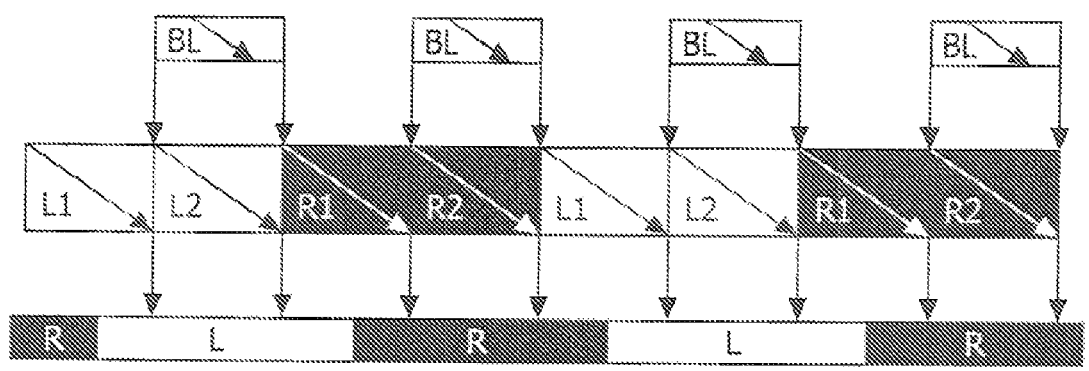
FIG. 2 is an example of a timing structure for driving elements of a display system.

FIG. 2 illustrates an example of how sequencing for such a time sequential multi-view display could be implemented. In the example, the display repeats images for each eye twice with the backlight switched on only during the second repetition. Thus, in the example, a left eye image is first rendered but with the backlight switched off such that that no image is displayed. During this time slot, the pixels of the display are addressed and set to the appropriate value for the image. Due to the response time of the display, it takes some time for the LCD pixel to reach the appropriate level. In the example, the image rate is 240 Hz, corresponding to duration of approximately 4 msecs. However, the response time for typical LCD pixels is typically around 3-8 msec. Accordingly, the first image interval is mainly used for the transition of the individual pixels to the appropriate level. In the following left eye image, the same pixel values are used but it is now assumed that the pixels are close to the correct level due to the transition already taking place in the first image interval L1. Thus, during the second image interval, the backlight is switched on and the display shows the image. The process is then repeated for the right image with a first right eye image interval R1 wherein the backlight is switched off and the LCD pixels are transitioned followed by a second right eye image interval R2 in which backlight is switched on and the image is displayed. This is then followed by the next left eye image in the sequence being displayed in the same way.

FIG. 2 further illustrates an example of how the shutter glasses could be operated to provide a 3D experience. In the example, the shutter elements of the shutter glasses alternate between the left and right shutter elements being open with the other shutter element being closed. The shutter glasses are synchronized to the images from the display such that the shutter element for each eye is open when the image for that eye is displayed on the display.

However, although this may provide an acceptable performance in many scenarios and applications, the relatively slow shutter element switching results in a perceived flickering which tends to be considered annoying by the viewer. However, as the response time of the display pixels has a duration that limits the frequency of the displayed images and thus the frequency at which the shutter elements can be operated in the example of FIG. 2, this flickering cannot be alleviated simply by increasing the frame rate of the display. Specifically, the image rate of 240 Hz, and the resulting backlight rate of 120 Hz, is already so high that it typically results in the pixels not fully completing the transition by the time the backlight is switched on. However, the image rate of 240 Hz results in an image rate for each eye of 60 Hz which is sufficiently low to introduce noticeable flickering.

However, the Inventor of the current invention has realized that the flickering is mainly resulting from the flickering introduced to ambient light and specific light sources in the environment and is less due to flickering of the images of the display. Accordingly, FIG. 3 illustrates an example wherein flickering may be reduced by increasing the effective flickering rate for ambient light while maintaining the same image rate.

Figure 3:
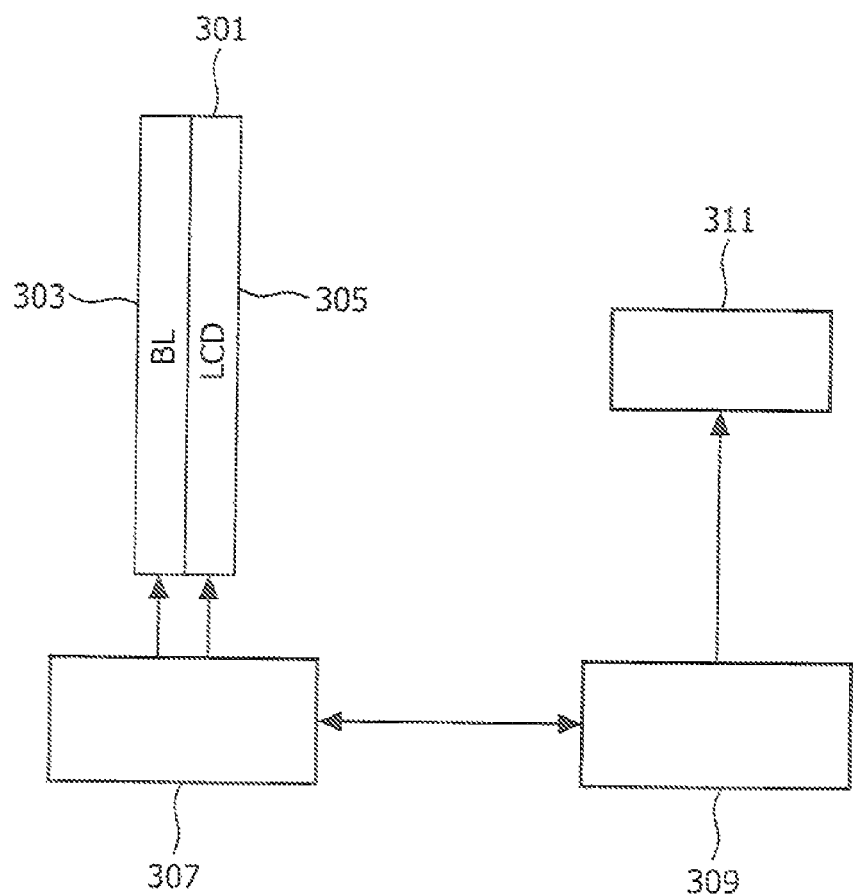
FIG. 3 is an illustration of an example of a display system in accordance with some embodiments of the invention.

In the example of FIG. 3, a display 301 comprises a backlight 303 and a controllable image panel 305 which can vary the attenuation/throughput of the backlight for individual pixels in response to an electrical drive value. In the specific example, the image panel 305 is an LCD layer comprising LCD pixels.

The system comprises a display controller 307 which is arranged to control the display 301. In the example, the display controller 307 generates a backlight drive signal which may switch the backlight 303 on and off. In addition, the display controller 307 generates a display drive signal which is fed to the LCD layer 305 and which comprises drive values for the individual pixels. Thus, the display drive signal comprises the pixel values for the images to be presented.

The display controller 307 controls the display 301 to display a sequence of multi-view images and in the specific example controls the display 301 to display a sequence of alternating images for the left and right eye.

The sequence of images are displayed in repeating view frames where each view frame comprises at least one view time slot allocated to each of the views of a plurality of views. Each view frame thus comprises a plurality of view time slots each of which is associated with one view of a scene and is used to present an image corresponding to that view. In the example where two views are considered (corresponding to the left and right eye view) the display drive signal is divided into view frames comprising two alternating view time slots, namely one for the left eye view and one for the right eye view.

Figure 4:
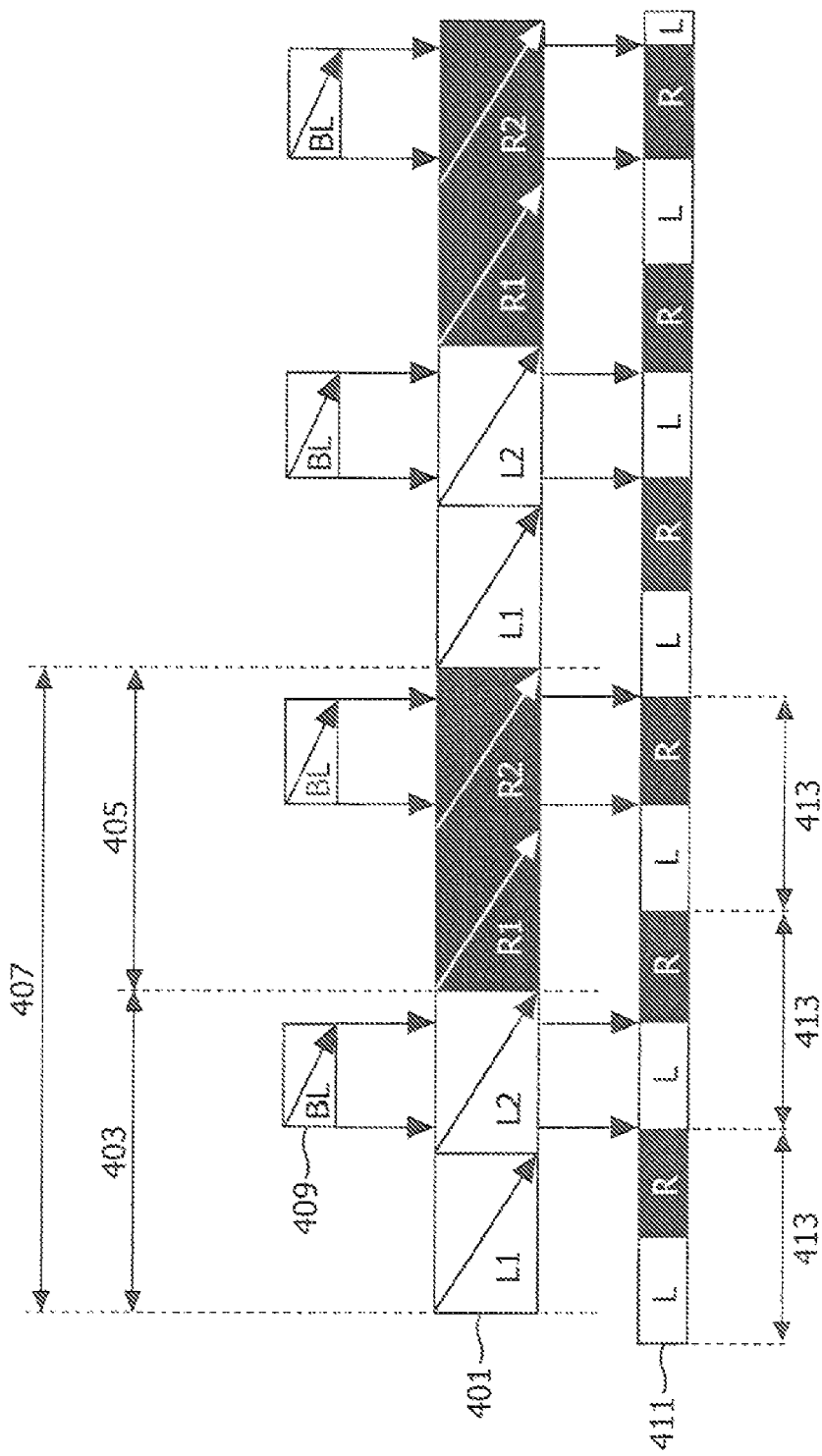
FIG. 4 is an example of a timing structure for driving elements of a display system in accordance with some embodiments of the invention.

FIG. 4 illustrates a display signal timing structure 401 for the display drive signal. In the example, the display drive signal comprises a sequence of view time slots 403, 405 each of which is allocated to one view. The two view time slots 304, 405 together form a view frame 407. In the example, a view time slot 403 for the left eye is followed by a view time slot 405 for the right eye and vice versa. In the example, each of the view time slots 403, 405 is made up of two display image frame time slots L1, L2, R1, R2. Each display image frame time slot L1, L2, R1, R2 corresponds to a time interval allocated to each image being displayed by the display. Thus, the display will typically have an inherent image or frame rate. For example, a 100 Hz display panel will display 100 images per second and thus will have a display image frame time slot duration of 10 msec. Each display image frame time slot may specifically be an image addressing time slot in which all image pixels of the display can addressed. Thus, typically, a display panel can be driven with a given image display frame rate and the drive signal is divided into consecutive time slots that each correspond to an image, i.e. each display image frame time slots may allow an addressing of all pixels in the display to provide the appropriate pixel drive value for the image. In the example, two display image frame time slots L1, L2, R1, R2 are used in each view time slot 403, 405 as it allows the first display image frame time slot L1, R1 to set the LCD pixels to the appropriate value and allows them to settle in time for the second display image frame time slot L2, R2. Thus, in the example, the first display image frame time slot L1, R1 of each view time slot 403, 405 is used to drive the LCD elements to the appropriate value and the second display image frame time slot L2, R2 is used to display the image for the appropriate view.

It will be appreciated that any suitable algorithm or method for driving the LCD pixels in the two display image frame time slots L1, L2, R1, R2 may be used. For example, the drive values for the first and second display image frame time slots L1, L2, R1, R2 may be identical for the same pixel, or e.g. exaggerated values may be used in the first display image frame time slot L1, R1 to force a faster transition towards the desired final value. This may for example be desirable for scenarios where the pixel response time is longer than the display image frame time slot duration resulting in the pixels not being fully settled in the first display image frame time slot L1, R1.

In some embodiments, the approach may apply black image insertion instead of image repetition. Thus, in the example of FIG. 4, frame repetition is used to provide the sequence L1, L2, R1, R2, etc. However, in other embodiments black image insertion may e.g. be applied to provide a sequence such as e.g. B, L, B, R, etc. where B refers to a black image. In this case the backlight can be illuminated during part of the B images thereby facilitating the backlight timing.

Figure 5:
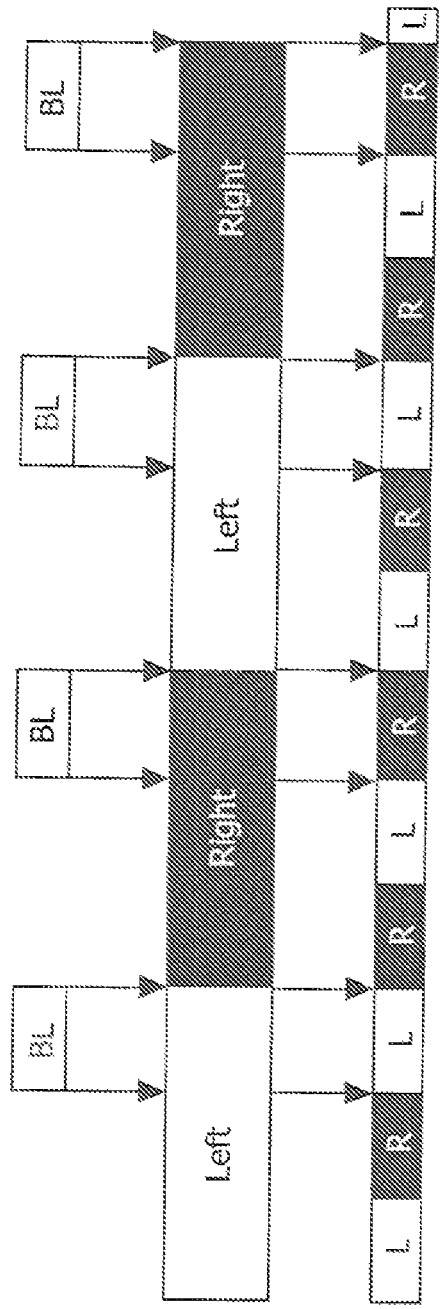
FIG. 5 is an example of a timing structure for driving elements of a display system in accordance with some embodiments of the invention.

It will also be appreciated that in other embodiments, other numbers of display image frame time slots may be used for each view frame. For example, in some embodiments only a single display image frame time slot may be used and in other embodiments three or more may be used. FIG. 5 illustrates an example where each view frame includes only one display image frame time slot for each view.

FIG. 4 further illustrates a backlight signal timing structure 409 for the backlight drive signal. In the example, the backlight is switched on only for part of the view time slots 403, 405. In particular, the backlight is switched on only during the second display image frame time slot L2, R2 such that only the display image frame time slot in which the LCD elements are relatively settled are used to display an image. Thus, the display 301 only displays an image during part of the view time slot and only during the second display image frame time slot L2, R2.

The display system of FIG. 3 further comprises a shutter controller 309 which is arranged to control a shutter device 311. In the example, the shutter device 311 are shutter glasses to be worn by a user but it will be appreciated that in other embodiments the shutter device need not be glasses but may be any shutter device which is arranged to control the time sequential viewing of the images displayed on the display 301.

In the example, the shutter glasses 311 have two shutter elements which can operate in (at least) an open shutter mode and a closed shutter mode. When the shutter element is in the open shutter mode, the light attenuation of the shutter element is less than when the shutter element is in the closed shutter mode. Thus, the open shutter mode is more transparent than the closed shutter mode.

Typically, the shutter elements may include an LCD layer that can be switched from a more transparent to a less transparent mode in response to an electrical signal. The shutter elements will typically introduce some light attenuation even in the open shutter mode which may be compensated by the brightness or light output of the display 301 being increased. Furthermore, some light may be allowed through the shutter element even in the closed shutter mode. However, typically, the difference in attenuation of the shutter elements in the open and closed shutter modes is at least 10 dB or in many cases advantageously 20 dB or even 30 dB. The difference in attenuation is often referred to as the contrast between the light throughput in the open and closed shutter modes. Typically, this is advantageously not less than 10:1; 100:1 or even 1000:1. A higher attenuation may provide reduced cross talk between the different images/views.

The shutter controller 309 is arranged to control the shutter glasses 311 to switch each shutter element between the open and closed shutter modes. In the example, the shutter elements operate complementary such that when one shutter element is in the open shutter mode then the other shutter element is in the closed shutter mode. However, it will be appreciated that in other embodiments, this may not be the case and that there may be an overlap between both shutter elements being in the open shutter mode or both elements being in the closed shutter mode. For example, both shutter elements may be open during a time when the backlight is off thereby allowing an increasing amount of environment light to reach the viewer.

The shutter elements are each associated with one view. Thus, in the example, a right shutter element is in use positioned in front of the viewer's right eye and is associated with the right eye views. Similarly, a left shutter element is in use positioned in front of the viewer's left eye and is associated with the left eye views.

The shutter controller 309 generates a shutter drive signal with a structure 411 that has repeating shutter frames 413 where each shutter frame 411 has a shutter time slot L,R for each of the shutter elements. In the example, each repeating shutter frame is divided into two time slots, namely one associated with the right eye shutter element and one associated with the left eye shutter element. It will be appreciated that in some embodiments, a shutter frame 413 may also contain other time slots, such as a time slot not associated with any of the shutter elements.

The shutter drive signal 411 is arranged to control the shutter elements such that a shutter element is in the open shutter mode during an allocated shutter time slot and in the closed shutter mode during other shutter time slots. Thus, during the time slot L associated with the left eye, the shutter drive signal 411 has a value that results in the left eye shutter being open and the right eye shutter being closed. Conversely, during the time slot R associated with the right eye, the shutter drive signal 411 has a value that results in the right eye shutter being open and the left eye shutter being closed.

The shutter signal 411 is synchronized with the drive signal 401 and further with the backlight drive signal 409. This synchronization is such that a given shutter element will be in the open shutter mode during at least part of the time interval in which the image for the corresponding view is being displayed by the display. Thus, in the backlight example, the shutter for the left eye will be in the open shutter mode for at least part of the time when the backlight is on during the second display image frame time slot L2 for the left eye. Similarly, the shutter for the right eye will be in the open shutter mode for at least part of the time when the backlight is on during the second display image frame time slot R2 for the right eye.

However, in contrast to the example of FIG. 2, the shutter frames and the view frames do not have corresponding durations. Rather, the shutter frame rate is higher than the view frame rate. Indeed, in many embodiments, the shutter frame rate may advantageously be no less than twice that of the view frame rate. Advantageously, the shutter frame rate is a multiple of the view frame rate as this facilitates operation and synchronization between the operation of the display and that of the shutter glasses. Thus, in many scenarios advantageous performance is achieved by the frame rate of the shutter signal being N times higher than the view frame rate of the display, where N=2,3,4 . . . etc. In the example of FIG. 4, N=3.

Furthermore, the synchronization is such that the shutter elements are only open in a view time slot for another view when no image is displayed. Thus, in the specific example, the synchronization is such that the right shutter element is only in the open shutter mode during the first view time slot 403 when the backlight is off. Similarly, the synchronization is such that the left shutter element is only in the open shutter mode during the second view time slot 405 when the backlight is off The synchronization between the shutter glasses and the display is thus such that during a view time slot associated with a given view, the display is in the image non-display mode during shutter time slots for shutter elements that are not associated with the view of the view time slot. This approach ensures that cross-talk between the images is maintained low, and often minimized, despite the shutter frame rate being substantially higher than the view frame rate.

The inventor of the current invention has realized that much improved performance can be achieved by using a different shutter frame rate and view frame rate and in particular that the perceived flickering may be reduced substantially without reducing the view frame rates to levels that unacceptably degrade the image due to the response times of the LCD pixels. This is particularly feasible and advantageous due to the realization that most of the perceived flickering is due to flickering introduced to ambient light and not to the perception of the display.

For example, in the example of FIG. 4, a threefold increase in the shutter frame rate is obtained without modifying the display addressing operation whatsoever. Thus, if the view frame rate is maintained at 120 Hz corresponding to an addressing time slot rate of 240 Hz and an image frequency for each eye of 60 Hz, the shutter frame rate may be increased from 60 Hz per eye to 180 Hz eye. Thus, a three times higher flickering rate for ambient light is achieved without affecting the dynamic performance or requirements for the display. This results in a substantially reduced flickering perception and will typically result in no flickering being perceived.

The increased shutter frame rates may provide additional design freedom and may indeed be used to not only improve flickering performance but alternatively or additionally to improve the image quality itself. In particular, the approach may be used to reduce the image frame rate to lower values.

As a specific example, an image rate of 48 Hz for each eye is generally acceptable and will be perceived as a smooth and fluid video sequence. However, a 48 Hz flickering rate for the ambient light is typically unacceptable and clearly perceptible. However, in the display system of FIG. 4, the image display rate may be reduced to 96 Hz resulting in an image display rate for each eye of 48 Hz. This can be achieved while maintaining the shutter frame rate at 144 Hz and thus an environment light flickering frequency for each eye of 144 Hz ensuring that this environment light flickering is not perceptible. In this way the high shutter frequency may reduce disadvantageous environment light flickering and interference while the 48 Hz panel/image flickering might be acceptable because of the limited light output of a display. Indeed, the Inventor has realized that such an approach is advantageous in many scenarios. The approach may exploit that increased luminance results in more significant flicker and that humans are more sensitive to flicker in the periphery or corners of the eye, and that in typical viewing scenarios the display is normally in the centre with environment light being in the corners. The approach may in the example result in the display image frame time slot rate being reduced from 240 Hz to 192 Hz thereby increasing the display image frame time slot duration from around 4 msec to around 5 msec. Thus, the time available for transitioning the LCD pixels may be increased while still maintaining advantageous flickering performance. Indeed, the approach may in many embodiments allow the display timing to be based only on trade-offs directly associated with the display and not with the shutter elements (such as desired image rate versus time for transitioning of LCD elements).

In many embodiments the view frame rate may advantageously be kept below 120 Hz or even 100 Hz (corresponding to an image rate for each eye of 60 Hz and 50 Hz respectively). This provides an display image frame time slot duration which is suitable for most practical displays. Indeed, LCD displays often have a response time in the region of 3-8 msec and the reduced view frame rate will therefore provide a substantial improved in image quality. Furthermore, the shutter frame rate may advantageously be kept above 90 Hz which provides for a flickering of ambient light that is typically not perceivable by a user.

In the example of FIG. 4, the image display interval corresponding to the time interval in which the backlight is on corresponds to a shutter time slot and is substantially identical (say with a duration deviating by less than e.g. 5%). However, in the example where the shutter frame rate is three times higher than the view frame rate, the division of the view frame into two display image frame time slots of half the duration of the view time slot, results in the shutter time slots having a duration which is shorter than the display image frame time slots. In the particular example the duration of a shutter time slot is ⅔ of the duration of an display image frame time slot. In order to ensure that the image cross talk is reduced, the display time interval, i.e. the time the display is in the image display mode with the backlight on, is set to correspond to the shutter time slot rather than to the display image frame time slot. Thus, in this example, the display image frame time slot and the backlight time slots have the same repetition frequency but different durations. Specifically, the image display image frame time slot duration of the display is longer than that of the shutter time slot.

In some embodiments, the display may deploy a scanning backlight. Thus, in some embodiments the backlight may not be switched on synchronously for the whole display but may be scanned. Scanning backlight in e.g. time sequential 3D LCD display applications may use a vertical scanning in such a way that the cross-talk level or amount of settling of the pixels is vertically about the same. Thus, as a result the cross-talk at the top, bottom or middle of the screen will be substantially the same thereby providing a vertically uniform 3D quality.

Thus, in some embodiments, the backlight may be a scanning backlight (as indicated by arrows in FIG. 4). Furthermore, the addressing of the individual pixels in the display image frame time slot is also sequential and thus the image updating also exhibits a scanning characteristic.

In the example of FIG. 4 wherein the image display time slot and the shutter time slots have different durations, these scanning operations will not correspond directly to each other, i.e. the scanning operations themselves will not be synchronized.

However, in some embodiments, the display controller is arranged to operate the display with an image addressing time slot duration that corresponds to the shutter time slot duration while still having an image addressing time slot repetition period that is higher than a shutter time slot duration.

Figure 6:
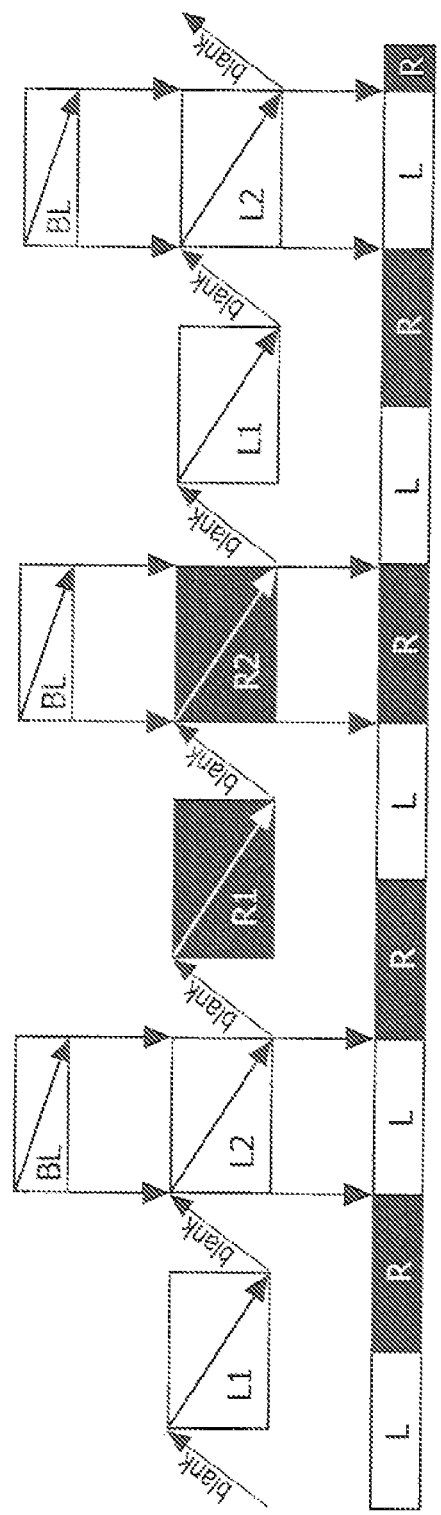
FIG. 6 is an example of a timing structure for driving elements of a display system in accordance with some embodiments of the invention.

An example of such is illustrated in FIG. 6. In the example, the display image frame time slots are reduced to have the same duration as a shutter time slot. Thus, in the example where the shutter rate (e.g. 288 Hz) is three times higher than the view frame rate (e.g. 96 Hz), each display image frame time slot is only a third of the duration of the view time slot for the view frame rate. However, the number of display image frame time slots is still maintained as two within each view time slot, and thus the period between display image frame time slots is still equal to half the duration of the view time slot. In the example, reduced duration display image frame time slots are accordingly interspersed with blanking time intervals in which no addressing of the display is undertaken. This approach may thus introduce blanking and make the display image frame time slot duration the same as the shutter time slot duration and the (scanning) backlight duration.

The reduced addressing time slot is synchronized with the shutter time slots and the display time slots and thus effectively provide the same characteristic as in the example of FIG. 4. However, an advantage of the approach of FIG. 6 is that it aligns the durations of the backlight time intervals and the display image frame time slots and thus allows the scanning operations for a scanning backlight and a display panel to be aligned and synchronized. This may in particular allow that the scanning of the backlight has the same vertical speed as the addressing of the pixels ensuring uniform 3D quality and in particular a vertically uniform cross talk.

Figure 7:
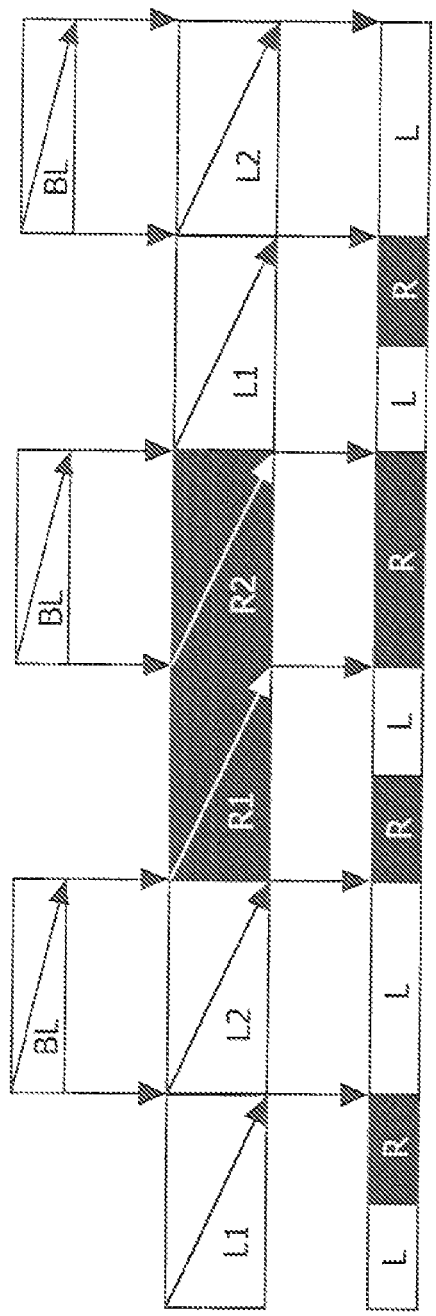
FIG. 7 is an example of a timing structure for driving elements of a display system in accordance with some embodiments of the invention.

The previous examples have focused on embodiments wherein the different time slots had the same durations. However, it will be appreciated that the described principles apply equally to scenarios wherein irregular time slots may be used. For example, FIG. 7 illustrates an example wherein the goggle time slot duration varies.

Although the previous description has focused on an LCD display it will be appreciated that the approach may be used with many other display types, including e.g. other backlight display types, reflective light display types or active pixel element display types.

It will also be appreciated that whereas the described examples focus on an operation wherein a display can be put in an image display mode by switching a backlight on, and in an image non-display mode by switching a backlight off, many other ways of entering a display into an image display mode or an image non-display mode can be used. It will also be appreciated that the image may not be switched completely off during the image non-display mode but that the image presented on the display may just have reduced intensity relative to the image presented when in the image display mode.

It will also be appreciated that whereas FIGS. 4 to 7 have been described with reference to the drive signals for the backlight, display and shutter device, they may be seen more generally as describing the operation of the display and shutter device themselves. I.e. they may be seen to relate directly to the images being displayed and the operation of the shutter elements.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A multi-view display system comprising:
a display controller (307) for controlling a display (301) to display a sequence of multi-view images in repeating view frames where each view frame comprises a view time slot (403, 405) allocated to each view of a plurality of views;
a shutter device (311) comprising at least two shutter elements, the shutter elements are positionable such that a viewer can watch the display with one eye through one of the shutter elements and with the other eye through another shutter element, the shutter elements are arranged to switch between an open shutter mode and a closed shutter mode, the open shutter mode being more transparent than the closed shutter mode and each shutter element being associated with a view of the plurality of views;
a shutter driver (309) for controlling the at least two shutter elements in repeating shutter frames (413) having a shutter time slot for each of the at least two shutter elements with a shutter element being in the open shutter mode during an allocated shutter time slot and in the closed shutter mode during other shutter time slots;
wherein a shutter frame rate of the repeating shutter frames is higher than a view frame rate of the repeating view frames; wherein the display controller (307) is operable to switch a display mode of the display (301) between an image non-display mode and an image display mode, and the multi-view display system is arranged to synchronize the control of the shutters and the switching of the display mode such that during each of a plurality of the view time associated with a first view, the display (301) is in the image non-display mode during shutter time slots of the shutter element not associated with the first view.

2. The multi view display system of claim 1 wherein the synchronization is such that during each of the plurality of the view time slots associated with the first views, the display (301) is in the image display mode during at least one shutter time slot of the shutter element associated with the first view.

3. The multi-view display system of claim 1 or 2 wherein each of the plurality of view time slots (403, 405) comprises at least one display image frame time slot having a duration longer than a duration of the shutter time slot, the display image frame time slot being a time slot corresponding to an image frame rate for the display (301).

4. The multi-view display system of claim 1 or 2 wherein each of the plurality of view time slots (403,405) comprises at least one display image frame time slot having a duration corresponding to the shutter time slot and a display image frame time slot period for consecutive display image frame time slots exceeding a shutter time slot duration, the display image frame time slot being a time slot corresponding to an image frame rate for the display (301).

5. The multi-view display system of claim 1 wherein the display controller (307) is arranged to switch the display mode by controlling a backlight of the display (301) to have a lower intensity in the image non-display mode than in the image display mode.

6. The multi-view display system of claim 3 wherein the backlight is a scanning backlight and the display controller (307) is arranged to synchronize a scanning of the backlight and the display of the sequence of multi-views.

7. The multi-view display system of claim 1 wherein each of the plurality of the view time slots (403, 405) comprises at least two display image frame time slots corresponding to the view frame rate for the display (301), and the display controller (307) is arranged to drive the display (301) in response to a same multi-view image in the at least two display image frame time slots.

8. The multi-view display system of claim 7 wherein the display controller (307) is operable to operate the display (301) in the image non-display mode during at least one of the at least two display image frame time slots.

9. The multi-view display system of claim 1 wherein the shutter device (311) is arranged to synchronize the shutter time slot for the shutter element associated with the first view to overlap at least one time interval in view frames for the first view in which the display (301) is in the image display mode.

10. The multi-view display system of claim 1 wherein the shutter frame rate is at least twice the view frame rate.

11. The multi-view display system of claim 1 wherein the shutter device (311) is a pair of shutter glasses.

12. The multi-view display system of claim 1 wherein the shutter device (311) is arranged to synchronize the repeating shutter frames to the repeating view frames.

13. A method of operation for a multi-view display system including a shutter device (311) comprising at least two shutter elements arranged to switch between an open shutter mode and a closed shutter mode, the open shutter mode being more transparent than the closed shutter mode and each shutter element being associated with a view of a plurality of views; the method comprising:
controlling a display (301) to display a sequence of multi-view images in repeating view frames where each view frame comprises a view time slot (403, 405) allocated to each view of the plurality of views; and
controlling the at least two shutter elements in repeating shutter frames (413) having a shutter time slot for each of the at least two shutter elements with a shutter element being in the open shutter mode during an allocated shutter time slot and in the closed shutter mode during other shutter time slots; the shutter elements are positioned such that a viewer can watch to the display with one eye through one of the shutter elements and with the other eye through another shutter element, and controlling the display (301) to switch between an image non-display mode and an image display mode; and synchronizing the control of the shutter and the switching of the display;

wherein a shutter frame rate of the repeating shutter frames is higher than a view frame rate of the repeating view frames; and wherein the synchronization is such that during a view time slot associated with a first view, the display (301) is in the image non-display mode during shutter time slots of a shutter element not associated with the first view.

\* \* \* \* \*